United States Patent
Sato et al.

(10) Patent No.: US 12,061,829 B2
(45) Date of Patent: Aug. 13, 2024

(54) MONITORING CONTROL APPARATUS, MONITORING CONTROL METHOD, MONITORING SYSTEM, AND MEDIUM

(71) Applicant: Canon Kabushiki Kaisha, Tokyo (JP)

(72) Inventors: Yuichiro Sato, Kanagawa (JP); Shuhei Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 17/171,099

(22) Filed: Feb. 9, 2021

(65) Prior Publication Data
US 2021/0247943 A1 Aug. 12, 2021

(30) Foreign Application Priority Data

Feb. 10, 2020 (JP) .................................. 2020-020893

(51) Int. Cl.
*G06F 3/12* (2006.01)
*G06Q 10/0631* (2023.01)
(Continued)

(52) U.S. Cl.
CPC .......... *G06F 3/1275* (2013.01); *G06F 3/1203* (2013.01); *G06F 3/1267* (2013.01);
(Continued)

(58) Field of Classification Search
CPC .... G06F 3/1275; G06F 3/1203; G06F 3/1267; G06V 20/44; G06V 20/52; G06V 20/41; G06Q 10/063114
See application file for complete search history.

(56) References Cited

U.S. PATENT DOCUMENTS

2005/0071495 A1 3/2005 Kadota
2008/0193146 A1* 8/2008 Yamada ................. G03G 15/50
399/79

(Continued)

FOREIGN PATENT DOCUMENTS

JP 2015-109613 A 6/2015
JP 2015-133020 A 7/2015
(Continued)

OTHER PUBLICATIONS

Athanasios Voulodimos et al: "A Threefold Dataset for Activity and Workflow Recognition in Complex Industrial Environments", IEEE Multimedia, IEEE Service Center, New York, NY, US, vol. 19, No. 3, Jul. 1, 2012 (Jul. 1, 2012), pp. 42-52, XP011457588, ISSN: 1070-986X, DOI: 10.1109/MMUL.2012.31.

(Continued)

*Primary Examiner* — John R Wallace
(74) *Attorney, Agent, or Firm* — Venable LLP

(57) ABSTRACT

A monitoring control apparatus is provided. The apparatus comprises at least one memory; and at least one processor. When executing a program stored in the at least one memory, the processor causes the apparatus to operate as a saving unit saving a capturing order of devices for each capturing unit; a holding unit holding, for each job, a state of a device used in the job; and a control unit specifying a target device in accordance with the capturing order and capture the specified target device with the capturing unit. The control unit specifies a target device as a next capturing target in accordance with the capturing order and if there is no job in which a state of the specified target device is a waiting state, specifies a next device as a target device in accordance with the capturing order.

9 Claims, 12 Drawing Sheets

(51) Int. Cl.
*G06Q 10/10* (2023.01)
*G06V 20/40* (2022.01)
*G06V 20/52* (2022.01)

(52) U.S. Cl.
CPC ... *G06Q 10/063114* (2013.01); *G06Q 10/103* (2013.01); *G06V 20/41* (2022.01); *G06V 20/52* (2022.01); *G06V 20/44* (2022.01)

(56) References Cited

U.S. PATENT DOCUMENTS

2009/0091783 A1* 4/2009 Kazume ............ H04N 1/00222
                                                      358/1.15
2015/0381947 A1   12/2015 Renkis
2016/0065430 A1    3/2016 Hirahara
2017/0201635 A1*  7/2017 Takamoto ............... G06F 3/121
2018/0259890 A1*  9/2018 Onodera ............ G03G 15/6594

FOREIGN PATENT DOCUMENTS

JP   2015-197846 A   11/2015
JP   2018081713 A    5/2018

OTHER PUBLICATIONS

European Office Action issued on Jun. 13, 2023 in counterpart European Patent Appln. No. 21155977.8.
Extended European Search Report issued on Jul. 13, 2021 in counterpart European Patent Appln. No. 21155977.8.
Co-pending U.S. Appl. No. 17/171,112, filed Feb. 9, 2021.

* cited by examiner

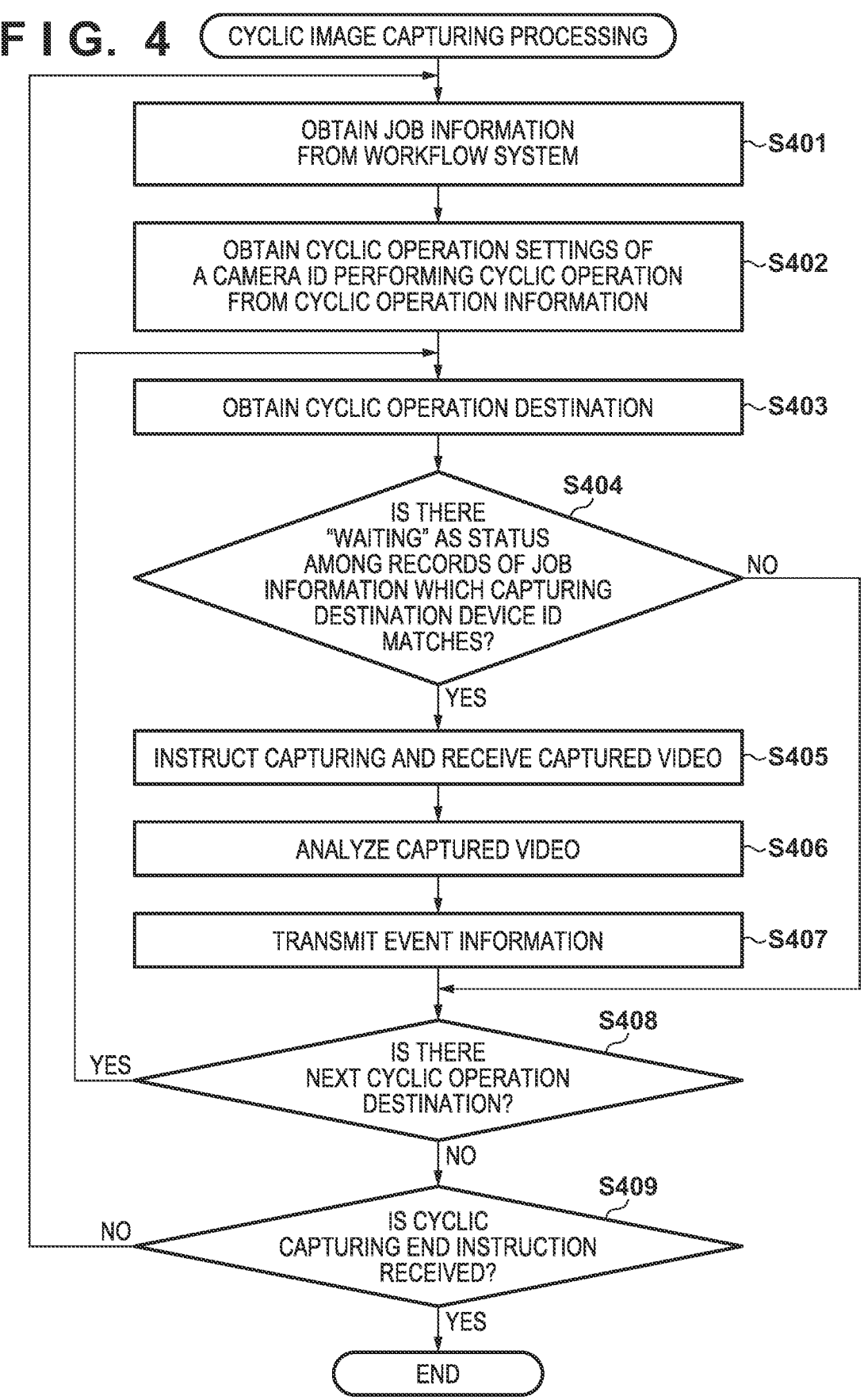

MONITORING CONTROL APPARATUS, MONITORING CONTROL METHOD, MONITORING SYSTEM, AND MEDIUM

BACKGROUND OF THE INVENTION

Field of the Invention

The present invention relates to a monitoring control apparatus, a monitoring control method, a monitoring system, and a medium which are associated with the collection of printing factory operation statuses by, for example, a network camera.

Description of the Related Art

Currently, demands have been raised to collect and analyze device operation states and operation execution states of workers in a printing factory and use the obtained information for improvement activities for productivity improvement. A printer used in a printing factory can collect information about the operation state of a device and notify the collected information to a workflow system as a management system via a network. However, operation states associated with preprocessing operations and postprocessing operations associated with device operations cannot be automatically collected via the printer. Examples of preprocessing operations include confirmation of operation instructions and data, preparation of a device and paper, and test printing. Example of postprocessing operations include product inspection and checkup with instructions.

There has been proposed a mechanism for inputting, via a mobile terminal, operation information such as start and end operations concerning these operations about which no operation information can be obtained via a network, transmitting the input information to an information collecting server, and holding the information in the server (see Japanese Patent Laid-Open No. 2018-81713). However, this method places a burden on a worker and does not guarantee to always record accurate times because the worker inputs information at his/her timings.

There may be a method of collecting information about operation states in a printing factory by operation monitoring with a network camera. A camera connected to a network captures indications on the control panels of a printer and a postprocessor, the lighting state of a pilot lamp, and the state of a worker around a device, detects changes in operation state, and collects corresponding information as events.

Assume that a plurality of devices are to be cyclically captured with a network camera to collect information about operation states. In this case, while a given device is captured, information about the operation state of another device cannot be collected. On the other hand, there are demands for the management of productivity including preprocessing operations, and hence there is high necessity to collect information about preprocessing operations that cannot be collected from a printer. Accordingly, there is a problem that information about the operation states of devices, including information about preprocessing operations, cannot be efficiently collected by only repeating cyclic capturing of a plurality of devices. More specifically, if an event such as a preprocessing operation with a device has occurred at the timing at which no capturing is performed, any change in operation state cannot be detected until the next timing of cyclic capturing.

SUMMARY OF THE INVENTION

The present invention more quickly detects a change in operation state by switching capturing targets in accordance with the statuses of devices to be observed.

The present invention in its first aspect provides a monitoring control apparatus comprising: at least one memory: and at least one processor wherein when executing a program stored in the at least one memory, the processor causes the apparatus to operate as: a saving unit configured to save a capturing order of devices for each capturing unit: a holding unit configured to hold, for each job, a state of a device used in the job; and a control unit configured to specify a target device in accordance with the capturing order and capture the specified target device with the capturing unit, wherein the control unit specifies a target device as a next capturing target in accordance with the capturing order and, if there is no job in which a state of the specified target device is a waiting state, specifies a next device as a target device in accordance with the capturing order.

The present invention in its second aspect provides a monitoring system comprising: a monitoring control apparatus: a capturing apparatus configured to perform capturing in at least a capturing direction: and an information processing apparatus configured to receive the event from the monitoring control apparatus and display the event on a user interface, the monitoring control apparatus comprising at least one memory: and at least one processor wherein when executing a program stored in the at least one memory, the processor causes the apparatus to operate as: a saving unit configured to save a capturing order of devices for each capturing unit, a holding unit configured to hold, for each job, a state of a device used in the job, a control unit configured to specify a target device in accordance with the capturing order and capture the specified target device with the capturing unit, a detection unit configured to receive a video obtained by capturing the target device with the capturing unit and detect an event associated with the target device based on the video, and a unit configured to transmit the detected event to an information processing apparatus configured to display the event on a user interface, and the control unit specifies a target device as a next capturing target in accordance with the capturing order and, if there is no job in which a state of the specified target device is a waiting state, specifies a next device as a target device in accordance with the capturing order.

The present invention in its third aspect provides a non-transitory computer-readable medium storing a program instruction for causing a computer to execute an operation when the computer is executing the program, the operation including: saving a capturing order of devices for each capturing unit; holding a state of a device used in each job: specifying a target device in accordance with the capturing order and capturing the specified target device with the capturing unit: and specifying a target device as a next capturing target in accordance with the capturing order and, if there is no job in which a state of the specified target device is a waiting state, specifying a next device as a target device in accordance with the capturing order.

The present invention in its fourth aspect provides a monitoring control method executed by a monitoring control apparatus including a saving unit saving a capturing order of devices for each capturing unit and a holding unit configured to hold, for each job, a state of a device used in the job, the method comprising: specifying a target device in accordance with the capturing order: capturing the specified target device with the capturing unit: and specifying a target device as a next capturing target in accordance with the capturing order and, if there is no job in which a state of the specified target device is a waiting state, specifying a next device as a target device in accordance with the capturing order.

According to the present invention, a change in operation state can be more quickly detected by switching capturing targets in accordance with the statues of devices to be observed.

Further features of the present invention will become apparent from the following description of exemplary embodiments with reference to the attached drawings.

BRIEF DESCRIPTION OF THE DRAWINGS

FIG. 4 is a flowchart for explaining a cyclic capturing method according to this embodiment;

DESCRIPTION OF THE EMBODIMENTS

First Embodiment

Figure 1:
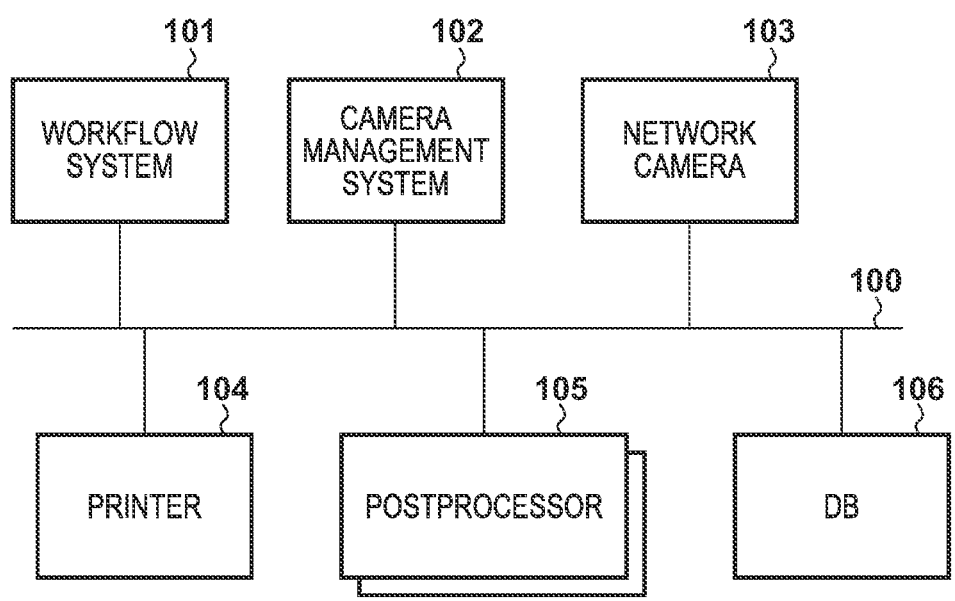
FIG. 1 is a block diagram showing the overall configuration of an event collection system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<System Configuration>

FIG. 1 is a block diagram showing the configuration of an event collection system according to this embodiment. The event collection system includes a workflow system 101, a camera management system 102, a network camera 103, a printer 104, a postprocessor 105, and a DB 106 which are configured to be communicable with each other via a network 100. In this case, the printer 104 is network-connected to the workflow system 101. The embodiment will exemplify a case in which there are a plurality of postprocessors 105 that perform postprocessing (edge trimming, bookbinding, and the like) after printing, and the respective postprocessors are network-connected. Note, however, that this system may include a plurality of printers 104 and may not include a plurality of postprocessors 105. The network is, for example, a so-called communication network implemented by a LAN such as the Internet, WAN, telephone line, or the like, and may be at least capable of transmitting and receiving data. Note that the event collection system can be regarded as a monitoring system that monitors devices to be observed.

The workflow system 101 is a system that manages printing by the printer 104 and postprocessing by the postprocessor 105, and manages job information including print data, print settings, device settings of postprocessors, and process information which are used for order production. In addition, the workflow system 101 receives and manages device operation states and process start and end instructions from the printer 104 and the postprocessor 105.

The workflow system 101 may be implemented by programs executed by an information processing apparatus. The workflow system 101 generates a print job and a postprocessing job to be transmitted to devices connected via the network based on information such as document data as source data, a format (print settings), and postprocessing settings, and transmits the jobs to the respective devices. In addition, the workflow system 101 generates instructions for instructing a processing procedure and presents the instructions as a printed product data to the operator. The operator makes preparations for printing and postprocessing by each device, that is, preprocessing operations, in accordance with the instructions and causes each device to execute a target process. The preprocessing operations include, for example, moving an output from a front-stage device in accordance with instructions and placing the output at a predetermined position on a next-stage device. Note that in this embodiment, a series of processes up to finishing one document into a printed product is called a job, and the unit of processing included in the job is called a process. However, when a given process is executed by a printer or postprocessor, operation instruction information generated by a workflow system concerning the process or processing based on the operation instruction information is sometimes called a "job". For example, such jobs include a print job and a processing job by a postprocessor.

The camera management system 102 manages a plurality of network cameras 103. The camera management system 102 instructs the network cameras 103 to perform capturing and receives the captured videos. In addition, the camera management system 102 detects the presence/absence of preprocessing operations for the respective devices, including the printer 104 and the postprocessor 105, from the received videos, and transmits the corresponding information as events to the DB 106. The camera management system 102 may be implemented by the programs executed by an information processing apparatus. The camera management system controls the monitoring function implemented by the monitoring control system, and hence can also be called a monitoring control apparatus. A monitoring control method is executed by the processing executed by the monitoring control apparatus.

The network camera 103 is a camera capable of zooming which is mounted on a camera platform whose capturing direction can be controlled by pan and tilt operations in accordance with instructions from the camera management system. In addition, the network camera 103 starts capturing, transmits a captured image, and finishes capturing in accordance with instructions from the camera management system.

The printer 104 receives print data and print settings from the workflow system 101 and performs printing. Accompanying such operations, the printer 104 transmits, to the workflow system 101, its own device states (such as in progress, normal termination, error termination, and waiting state) together with information that can specify a job and a process. The postprocessor 105 receives the device settings of a postprocessing device from the workflow system 101 and performs postprocessing. Accompanying such operations, the postprocessor 105 transmits, to the workflow system 101, its own device states (such as in progress, normal termination, error termination, and standby state) together with information that can specify a job and a process. The DB 106 receives and holds events from the camera management system 102. The DB 106 also generates an image that allows checking of the operation state of a printing factory from job information and events from the workflow system 101 in accordance with a request from a client PC (not shown).

<Hardware Configuration>

Figure 2A:
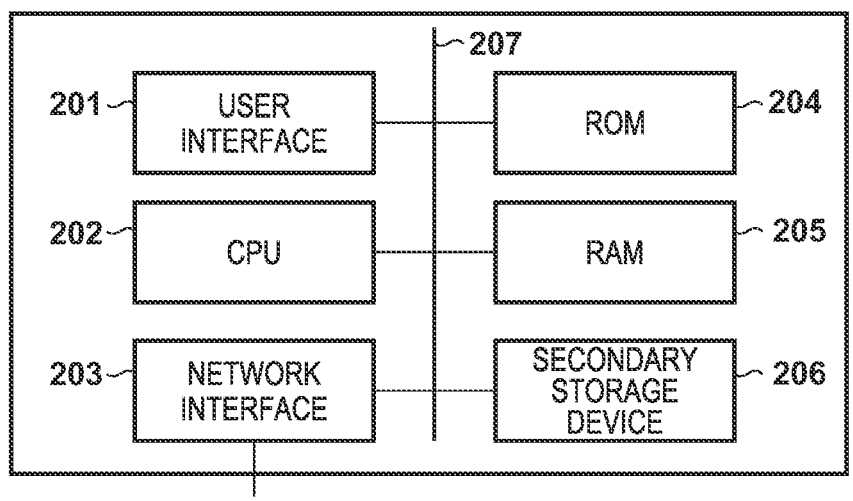
FIGS. 2A, 2B, and 2C are block diagrams showing the hardware configuration of this embodiment.

FIG. 2A is a block diagram showing the hardware configurations of the workflow system 101, the camera management system 102, and the DB 106 in FIG. 1.

A user interface 201 allows the user to input and output information using a display, keyboard, mouse, touch panel, and the like. A network interface 203 is connected to the network 100 such as a LAN to communicate with other computers and network devices. Incorporated programs and data are recorded in a ROM 204. A RAM 205 is a temporary storage area. A secondary storage device 206 is a secondary storage typified by an HDD. A CPU 202 executes programs read out from the ROM 204, the RAM 205, the secondary storage device 206, and the like. Each unit is connected via a bus 207.

Figure 2B:
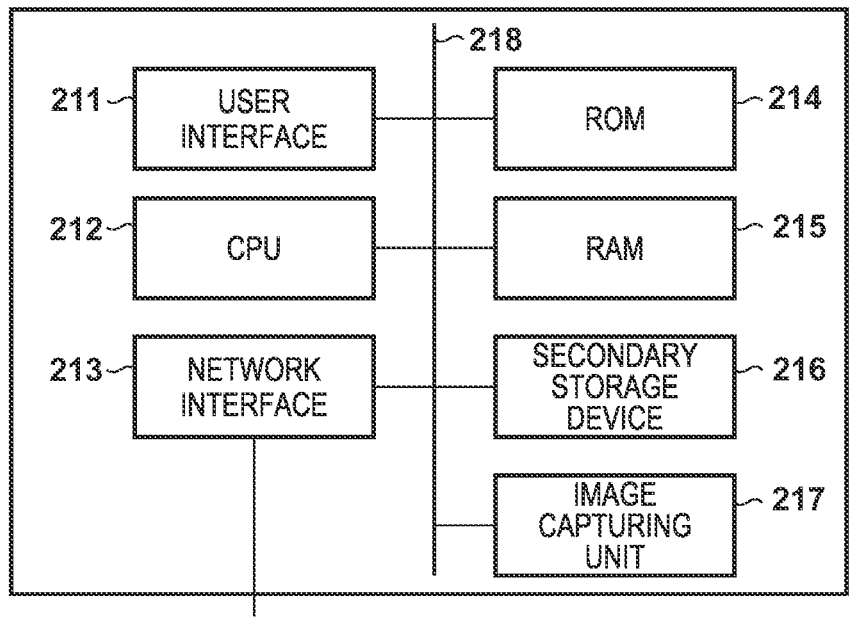

FIG. 2B is a block diagram showing the hardware configuration of the network camera 103 in FIG. 1. A user interface 211 allows connection and operation from another computer via the remote shell. A network interface 213 connects to a network such as a LAN to communicate with another computer or network device. Incorporated programs and data are recorded in a ROM 214. A RAM 215 is a temporary memory area.

A secondary storage device 216 is a secondary storage typified by an HDD. A CPU 212 executes programs read out from the ROM 214, the RAM 215, the secondary storage device 216, and the like. An image capturing unit 217 includes a CCD and stores the videos obtained by capturing images of imaging targets in the secondary storage device 216. Each unit is connected via a bus 218.

Figure 2C:
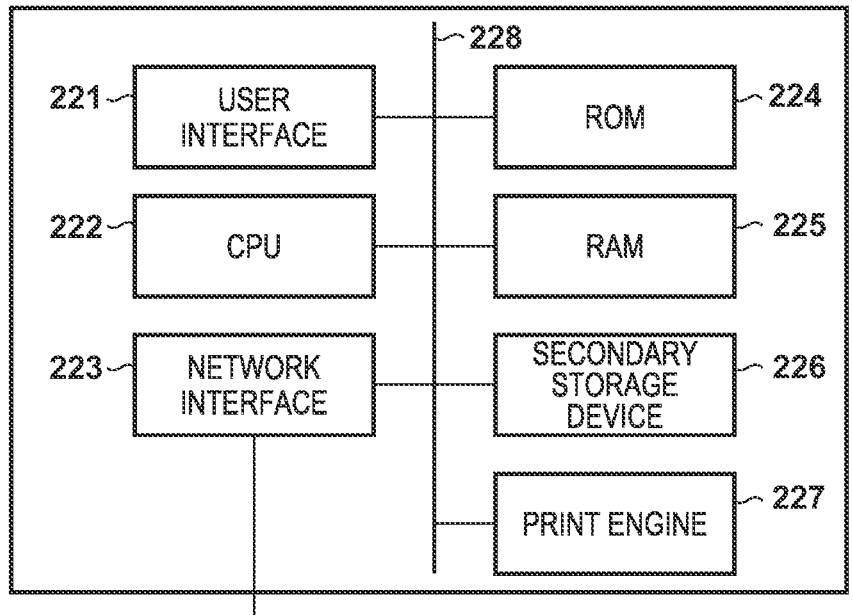

FIG. 2C is a block diagram showing the hardware configuration of the printer 104 in FIG. 1. A user interface 221 allows the user to input and output information by using a display, keyboard, touch panel, and the like. A network interface 223 is connected to the network 100 such as a LAN to communicate with other computers and network devices. Incorporated programs and data are recorded in a ROM 224. A RAM 225 is a temporary storage area. A secondary storage device 226 is a secondary storage typified by an HDD. A CPU 222 executes programs read out from the ROM 224, the RAM 225, the secondary storage device 226, and the like. A print engine 227 prints data on paper (sheet). Each unit is connected via a bus 228. The postprocessor 105 may have a configuration obtained by replacing the print engine 227 of the configuration in FIG. 2C with a device for postprocessing.

<Software Configuration>

FIGS. 3A to 3F show the software configurations of the workflow system 101, the camera management system 102, the network camera 103, the printer 104, the postprocessor 105, and the DB 106 shown in FIG. 1. The operations of these components will be described below. The CPU implements these operations by executing programs saved in the memories of the respective devices.

-Workflow System

Figure 3A:
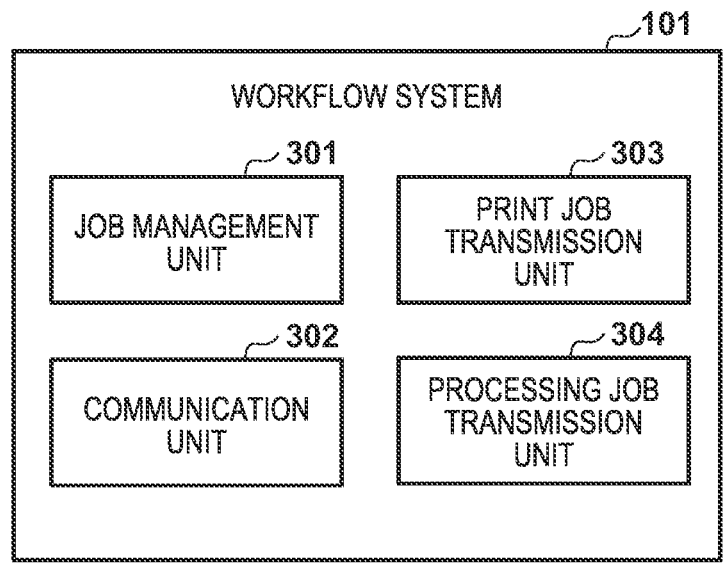
FIGS. 3A to 3F are block diagrams showing the software configuration of this embodiment.

The workflow system 101 shown in FIG. 3A includes a job management unit 301, a communication unit 302, and a print job transmission unit 303. The job management unit 301 of the workflow system 101 manages, as job information, information about a production process for producing an ordered product. Table 1 illustrates an example of part of job information managed by the job management unit 301. For the sake of description, this table shows a case in which there are three jobs. Job information is often information about many jobs to be processed in a given day.

TABLE 1

| Job ID | Process ID | Device ID | Status | Start Date and Time | End Date and Time |
|---|---|---|---|---|---|
| job_001 | p_001 | Device_A | in progress | 2019 November-21T 11:50:00Z | |
| job_001 | p_002 | Device_C | waiting | | |
| job_002 | p_001 | Device_A | waiting | | |
| job_003 | p_001 | Device_B | normal termination | 2019 November-21T 11:00:00Z | 2019 November-21T 11:20:00Z |

Job information is a data table for managing production processes and production states of ordered products managed by the workflow system 101, and is constituted by "job ID", "process ID", "device ID", "status", "start date and time", and "end date and time".

"Job ID" is an ID for identifying an ordered product managed by the workflow system 101, and is constituted by a plurality of process IDs (to be described later). "Process ID" is an ID for uniquely identifying an operation process constituting a job, including printing by the printer 104 and bookbinding, cutting, and the like by the postprocessor 105. Processes are sequenced, and the order of the processes can be discriminated by comparing the magnitudes of the process IDs in this embodiment. According to the example illustrated by Table 1, there are jobs for producing three ordered products. The job "job_001" is constituted by the processes "p_001" and "p_002" in this order, and the remaining jobs each are constituted by a single process.

"Device ID" includes IDs for uniquely identifying devices as the printer 104 and the postprocessor 105 which are used in an operation process. "Status" represents the execution state of an operation process. In this embodiment, "status" includes "waiting" as a state before the start of an operation process, "in progress" as an operating state of each of the printer 104 and the postprocessor 105, and "normal termination" as a state after the completion of the operation process. However, "status" may include other statuses.

"Start date and time" is the operation start date and time of an operation process, and "end date and time" is the operation end date and time of the operation process. Such pieces of information are added as the above status is changed in accordance with a device operation state notification request from the printer 104 (to be described later) or a client PC (not shown).

The job management unit 301 receives a device operation state notification request including a device ID, a device operation state, and a process ID from the printer 104 or a client PC (not shown). The job management unit 301 then updates the status of the job information, the start date and time, and the end date and time in accordance with the contents of the received device operation state notification request.

For example, the printer 104 receives a print job including the job ID "job_001" and the process ID "p_001" from the workflow system 101, and executes print processing. Upon starting the print processing, the printer 104 detects a change in the device state of the printer 104 itself as an event. The printer 104 transmits a device operation state notification request including the device ID "Device_A", the job ID "job_001", the process ID "p_001", and the device operation state "printing" in accordance with the event. At this time, the job management unit 301 searches the job information for a record matching the job ID and the process ID. If the status of the corresponding record is "waiting", the job management unit 301 regards that the operation process proceeds to an operation state, and changes the status of the record to "in progress". In addition, the job management unit 301 sets the request reception time as the time when the status is changed to "in progress" to the start date and time. If there is no corresponding record, the job management unit 301 adds a new record and registers the value of each item of the received information.

Upon completion of print processing, the printer 104 transmits a device operation state notification request including the device ID "Device_A" of the printer 104 itself, the job ID "job_001", the process ID "p_001", and the device operation state "end of printing" in accordance with the event. At this time, the job management unit 301 searches the job information for a record matching the job ID and the process ID. If the status of the record is "in progress", regarding that the operation process is set in a completion state, the job management unit 301 changes the status of the record to "normal termination". In addition, the job management unit 301 sets the request reception time as the time when the status is changed to "normal termination" to the end date and time.

Like the printer 104, the postprocessor 105 transmits an operation state notification request via the network in accordance with the occurrence of an event. Although this embodiment exemplifies a case in which the postprocessor 105 is connected to the network, the present invention is also applicable to even the postprocessor 105 that cannot transmit an operation state notification request via the network. When using the postprocessor 105 that is not network-connected, the worker generates and transmits an operation state notification request from a tablet or client PC (not shown).

In addition, the job management unit 301 receives job information acquisition requests from the camera management system 102 and the DB 106 and transmits job information as responses.

The print job transmission unit 303 issues a print instruction by transmitting print data as a print job, together with a job ID and a process ID, to the printer 104 via the communication unit 302. A processing job transmission unit 304 issues a processing instruction by transmitting the device settings of a postprocessor as a processing job, together with a job ID and a process ID, to the postprocessor 105 via the communication unit 302.

Camera Management System

Figure 3B:
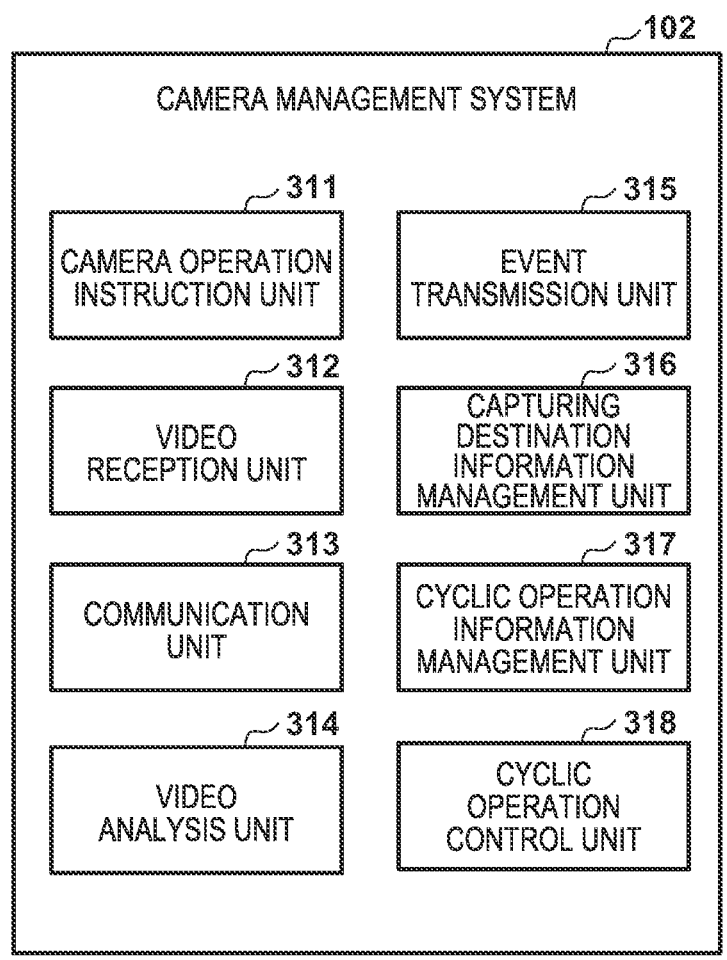

The camera management system 102 shown in FIG. 3B includes a camera operation instruction unit 311, a video reception unit 312, a communication unit 313, a video analysis unit 314, an event transmission unit 315, a capturing target information management unit 316, a cyclic operation information management unit 317, and a cyclic operation control unit 318.

The camera operation instruction unit 311 issues a capturing instruction to the network camera 103 via the communication unit 313. The video reception unit 312 receives the video captured by the network camera 103, that is, the captured video. The video analysis unit 314 performs video analysis on the received captured video, such as human detection and detection of the lighting of a device control lamp, and determines a preprocessing operation state to determine whether a preprocessing operation is in progress. The event transmission unit 315 transmits the determination result on the preprocessing operation state and the device ID and time (to be described later) as an event to the DB 106 via the communication unit 313.

Table 2 illustrates an example of the capturing target information managed by the capturing target information management unit 316.

TABLE 2

| Camera ID | Capturing target Device ID | Capturing Direction (Pan, Tilt, Zoom) |
|---|---|---|
| Cam_A | Device_A | 120, 65, 3.2 |
| Cam_A | Device_B | 55, 23, 2.5 |
| Cam_A | Device_C | 356, 24, 1 |

Capturing target information is a data table for managing the network camera 103 and capturing target devices managed by the camera management system 102, and is constituted by "camera ID", "capturing target device ID", and "capturing direction".

"Camera ID" is an ID for uniquely identifying the network camera 103 managed by the camera management system 102. "Capturing direction" holds the values of "Pan" (rotational angle), "Tilt" (tilt angle), and "Zoom" (enlargement/reduction) as capturing parameter information of a network camera. "Capturing target device ID" is an ID for uniquely identifying a device such as the printer 104 or the postprocessor 105 captured in the corresponding capturing direction by the camera with the corresponding ID. "Capturing target information" is set by the operator for each associated camera at the time of movement, installation, or removal of a network camera or device to be monitored, and may be saved in the cyclic operation control unit 318.

When a specific device is to be captured by a specific camera, the camera management system 102 obtains a capturing direction from a record in which the camera ID of the capturing target information matches the capturing target device ID. The camera management system 102 can obtain a video of a desired device by performing Pan, Tilt, and Zoom operations in the capturing direction obtained for the network camera 103 with the corresponding camera ID and issuing a capturing instruction.

Table 3 illustrates an example of cyclic operation information managed by the cyclic operation information management unit 317.

TABLE 3

| Camera_ID | Cyclic Operation Settings |
|---|---|
| Cam_A | [Device_A, human detection, 60 sec]<br>[Device_B, detection of lighting of lamp, 60 sec]<br>[Device_C, human detection, 60 sec] |

Cyclic operation information is constituted by the network camera 103 managed by the camera management system 102 and cyclic operation settings including capturing target devices and event detection processing. Cyclic operation information is information indicating the capturing order of target devices, detection targets, and capturing times. "Camera ID" is an ID for uniquely identifying the network camera 103 managed by the camera management system 102. "Cyclic operation settings" is a list indicating the order of capturing processing (or monitoring processing), including combinations each having a device ID as the capturing target of the network camera 103 (that is, a monitoring target), video analysis processing of detecting a preprocessing operation from a captured video, and a capturing time.

Video analysis processing is the processing of determining that the time in which a human is detected in a video is a preprocessing operation time in the case of, for example, "human detection". In the case of "detection of lighting of lamp", video analysis processing is the processing of determining that the time in which a lamp such as a device cover open/close state lamp is lighted. Video analysis processing in cyclic operation settings is information designating the execution of the processing of detecting a detection target from video information. A capturing time is information designating the time in which a device to be monitored is captured. Elements included in a list of cyclic operation settings will be referred to as cyclic operation destinations hereinafter. Cyclic operation information may be set in advance and saved in the cyclic operation control unit 318.

In the case of Table 3, cyclic operation settings concerning the camera indicated by "Cam_A" are registered. According to Table 3, cyclic operation settings for the execution of cyclic capturing and the detection of preprocessing operations concerning three devices, namely the device "Device_A", the device "Device_B", and the device "Device_C", in this order are associated with the camera ID "Cam_A".

The settings at the first cyclic operation destination include a capturing and analysis method of capturing the device "Device_A" for 60 sec, specifying the time in which a human is detected from the video, and determining the specified time as a preprocessing operation time. The settings at the next cyclic operation destination include a capturing and analysis method of capturing the device "Device_B" for 60 sec, specifying the time in which a lamp in the video is lighted, and determining the specified time as a preprocessing operation time. The settings at the last cyclic operation destination include a capturing and analysis method of capturing the device "Device_C" for 60 sec, specifying the time in which a human is detected from the video, and determining the specified time as a preprocessing operation time. Cyclic capturing with Cam_A is performed by sequentially capturing these cyclic operation destinations in accordance with the cyclic operation information and analyzing the obtained videos. That is, the operation of sequentially capturing targets in accordance with cyclic operation information will also be referred to as a cyclic operation. The operation of analyzing a video and detecting a target may also be referred to as a cyclic operation.

In principle, the cyclic operation control unit 318 controls capturing of a monitoring target with the network camera 103 and video analysis in accordance with cyclic operation settings. In addition, the cyclic operation control unit 318 obtains job information from the workflow system 101 and determines whether to perform capturing of a device at the cyclic operation destination of the cyclic operation settings of cyclic operation information and analysis of a video. That is, control is performed to skip capturing and video analysis on even a device for which cyclic operation settings designate that capturing and video analysis are to be performed in accordance with job information.

Network Camera

Figure 3C:
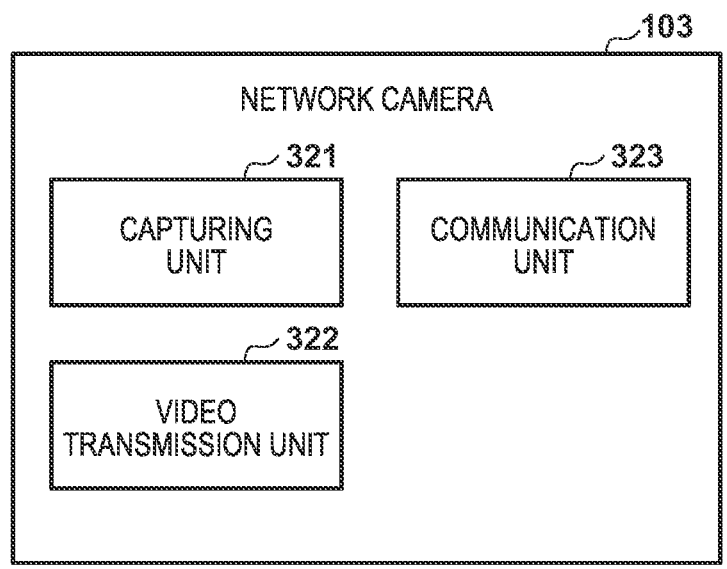

The network camera 103 shown in FIG. 3C includes a capturing unit 321, a video transmission unit 322, and a communication unit 323. Upon receiving an image capturing instruction including a capturing direction from the camera management system 102 via the communication unit 323, the capturing unit 321 performs capturing in the designated direction with the designated magnification using the camera. The video transmission unit 322 transmits the video captured by the capturing unit 321 to the camera management system 102 via the communication unit 323.

Printer

Figure 3D:
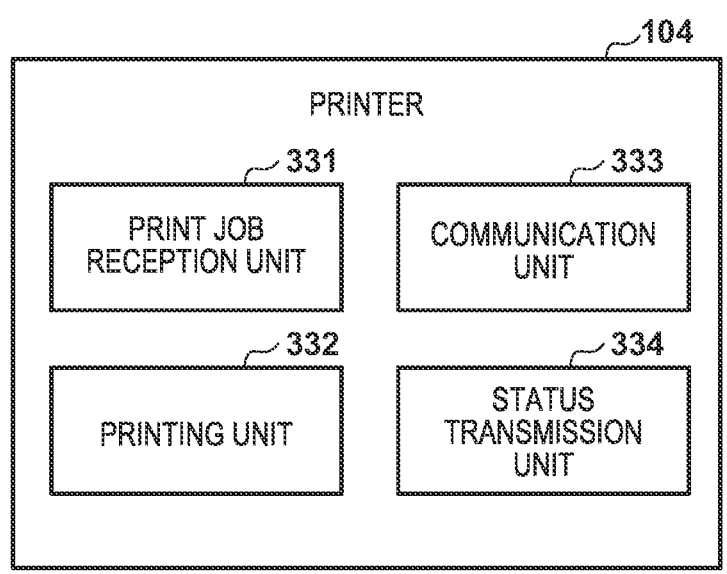

The printer 104 shown in FIG. 3D includes a print job reception unit 331, a printing unit 332, a communication unit 333, and a status transmission unit 334. The print job reception unit 331 receives the print job transmitted from the workflow system 101 via the communication unit 333, and the printing unit 332 performs print output. In addition, the status transmission unit 334 detects a change in own device status (for example, in progress, error termination, normal termination, or waiting) if any. The status transmission unit 334 then transmits the status after the change, together with the job ID received with the print job (that is, the job corresponding to the change in device state) and a process ID, as an operation state notification request to the workflow system 101.

Postprocessor

Figure 3E:
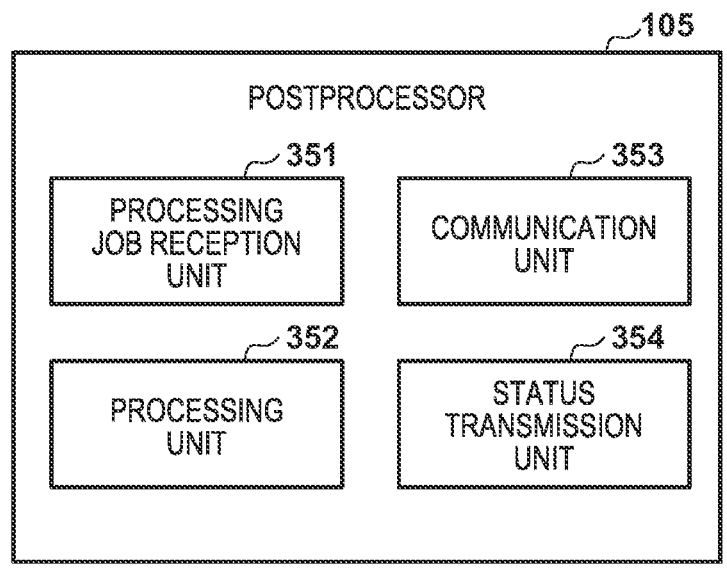

The postprocessor 105 shown in FIG. 3E includes a processing job reception unit 351, a processing unit 352, a communication unit 353, and a status transmission unit 354. The processing job reception unit 351 receives the processing job transmitted from the workflow system 101 via the communication unit 353, and the processing unit 352 performs postprocessing. In addition, the status transmission unit 354 detects a change in own device status (for example, in progress, error termination, normal termination, or waiting) if any. The status transmission unit 354 then transmits the status after the change, together with the job ID received with the print job(that is, the job corresponding to the change in device state) and a process ID, as an operation state notification request to the workflow system 101.

Database (DB)

Figure 3F:
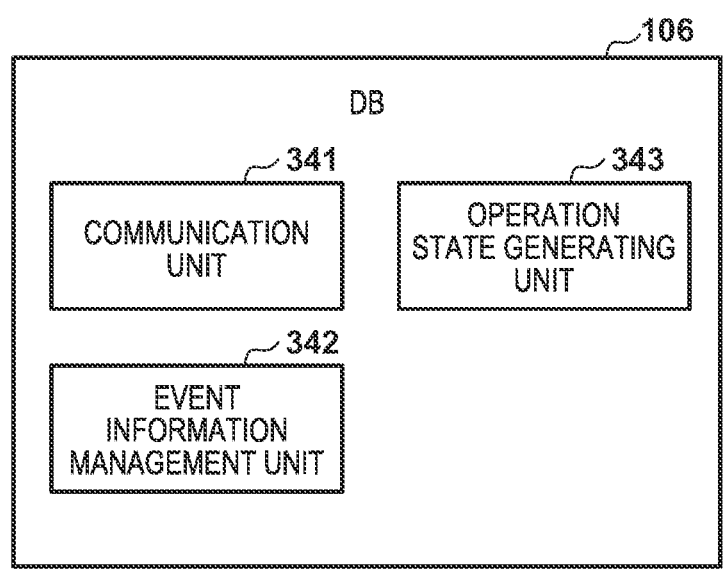

The DB 106 shown in FIG. 3F includes a communication unit 341, an event information management unit 342, and an operation state generating unit 343. The event information management unit 342 receives the event transmitted from the camera management system 102 via the communication unit 341 and manages the event as event information (to be described later). Table 4 illustrates an example of event information managed by the event information management unit 342.

TABLE 4

| Detection Start Date and Time | Detection End Date and Time | Device ID |
|---|---|---|
| 2019 November-21T10:31:00Z | 2019 November-21T10:32:00Z | Device_B |
| 2019 November-21T10:34:00Z | 2019 November-21T10:35:00Z | Device_B |
| 2019 November-21T10:41:00Z | 2019 November-21T10:42:00Z | Device_B |
| 2019 November-21T10:44:00Z | 2019 November-21T10:45:00Z | Device_B |
| 2019 November-21T11:46:00Z | 2019 November-21T11:46:45Z | Device_A |

Event information is constituted by the detection start date and time when a preprocessing operation is started, the detection end date and time when the preprocessing operation is ended, and the device ID indicating the device by which the preprocessing operation is executed.

According to Table 4, for example, the record on the first row indicates that a preprocessing operation has been done by the device with the device ID "Device_B". The period of the operation is from the detection start date and time "2019-11-21T10:31:00Z" to the detection end date and time "2019-11-21T10:32:00Z".

The operation state generating unit 343 generates a screen displaying preprocessing operations by the respective devices and the device operation states from job information and event information from the workflow system 101 in accordance with an operation state screen acquisition request from a client PC (not shown).

<Cyclic Operation Capturing Processing>

FIG. 4 is a flowchart for explaining a cyclic capturing method in the camera management system 102 according to this embodiment. Note that each step is implemented when the CPU 202 executes a stored control program. Note that FIG. 4 shows a processing procedure with focus on one camera. When a cyclic operation is to be performed with a plurality of cameras, the procedure shown in FIG. 4 may be concurrently executed with respect to each of the plurality of cameras.

In step S401, the cyclic operation control unit 318 transmits a job information acquisition request to the workflow system 101 via the communication unit 313, and obtains job information of all the jobs managed by the workflow system 101.

In step S402, the cyclic operation control unit 318 obtains, via the cyclic operation information management unit 317, a list of cyclic operation destinations as cyclic operation settings corresponding to a camera ID indicating a camera that performs a cyclic operation.

In step S403, the cyclic operation control unit 318 obtains cyclic operation destinations by sequentially reading out of the cyclic operation destination list obtained in step S402.

In step S404, the cyclic operation control unit 318 determines whether there is a record including "waiting" as a status among the records of the job information obtained in step S401 which include device IDs matching the capturing targets included in the cyclic operation destinations. For example, in the case of the first cyclic operation destination in the cyclic operation settings in Table 3, the device ID at the capturing target is "Device_A". If the job information at this time is like that shown in Table 1, the cyclic operation control unit 318 determines that there is a record including "waiting" as a status (see the third row of Table 1, on which the job ID is "job_002" and the process ID is "p_001").

Upon determining in step S404 that there is no record whose status is "waiting", the cyclic operation control unit 318 executes step S408. In contrast to this, if there is a record whose status is "waiting", the cyclic operation control unit 318 determines that there is a possibility of performing a preprocessing operation, and executes step S405 (to be described later).

In step S405, the camera operation instruction unit 311 obtains the capturing direction of a record whose camera ID matches the device ID at the capturing target from the capturing target information (Table 2) via the capturing target information management unit 316. The camera operation instruction unit 311 then transmits a capturing instruction including Pan, Tilt, and Zoom operations in the capturing direction and the capturing time at the capturing target to the network camera 103 with the camera ID via the communication unit 313, and waits for the acquisition of a video. The capturing direction and the capturing time may be obtained from capturing target information and cyclic operation information, respectively. For example, in the case of the first cyclic operation destination in the cyclic operation settings in Table 3, the settings include the camera ID "Cam_A", "Device_A" as the device ID at the capturing target, and "60 sec" as the capturing time. If the capturing target information at this time is like that shown in Table 2, the capturing direction of "Device_A" by "Cam_A" is represented by Pan "120", Tilt "65", and Zoom "3.2". The camera operation instruction unit 311 transmits, to the network camera "Cam_A", a video capturing instruction designating movement to the capturing target represented by Pan "120", Tilt "65", and Zoom "3.2" and 60-sec capturing, and waits for the acquisition of a video.

The capturing unit 321 of the network camera 103 that has received the capturing instruction moves the camera in the operating direction instructed from the camera operation instruction unit 311 and captures a video for the capturing time. Upon completion of the capturing, when the video transmission unit 322 transmits the captured video to the camera management system 102, the video reception unit 312 of the camera management system 102 receives the captured video. Obviously, the video transmission unit 322 may transmit a captured video during capturing.

In step S406, the video analysis unit 314 obtains an analysis processing target in the cyclic operation settings from the cyclic operation information management unit 317, and analyzes the captured video in accordance with the analysis processing target. For example, in the case of "human detection", the video analysis unit 314 analyzes whether a human is reflected in the captured video. In the case of "detection of lighting of lamp", the video analysis unit 314 analyzes whether the control lamp is lighted and whether a preprocessing operation has been executed. The video analysis unit 314 may detect the lighting of the lamp by detecting a bright point and may detect a human by collating a feature point or movement in an image with a pattern. Obviously, the video analysis unit 314 may perform such detection by other methods. In the case of human detection, if the position of a human relative to a monitoring target device is determined in preprocessing, a limited area including the position in a video may be set as a detection target area. In the case of the detection of the lighting of the lamp, since the position of the lamp in a video can be specified in advance, a limited area including the position may be detected. If a preprocessing operation is detected, the detection date and time is transmitted as event information to the DB 106 in step S407.

In step S407, the event transmission unit 315 transmits a device ID as a capturing target and the detection start date and time and detection end date and time of the preprocessing operation detected by the video analysis in step S406 as event information to the DB 106 via the communication unit 313.

Note that the detection start date and time and the detection end date and time may be specified in one capturing chance (that is, a period in which a target device is captured). For example, the detection start date and time may be a period in which a detection target human or the lighting of a detection target lamp appears in a video as a result of video analysis. If a detection target is detected at the start time of capturing, the capturing start period may be set as the detection start date and time. The detection end date and time may be a period in which the detection target disappears from the video as a result of video analysis. If the detection target is detected at the end time of capturing, the capturing end date and time may be set as the detection end date and time.

In step S408, the cyclic operation control unit 318 determines whether a next cyclic operation destination can be obtained from the cyclic operation settings. Assume that no cyclic operation destination can be obtained. In this case, if, for example, cyclic capturing is completed at all three cyclic operation destinations in the case of Table 3, the process shifts to step S409. In contrast to this, if a cyclic operation destination can be obtained in step S408, that is, processing is not completed at all the cyclic operation destinations, the process returns to step S403.

In step S409, the camera operation instruction unit 311 determines whether it has received a cyclic capturing end instruction. If YES in step S409, the camera operation instruction unit 311 ends the processing. If NO in step S409, the process returns to step S401 to repeat cyclic capturing.

In the above manner, the camera management system 102 performs cyclic capturing with the network camera 103.

<Generation of Operation State Screen>

Figure 5:
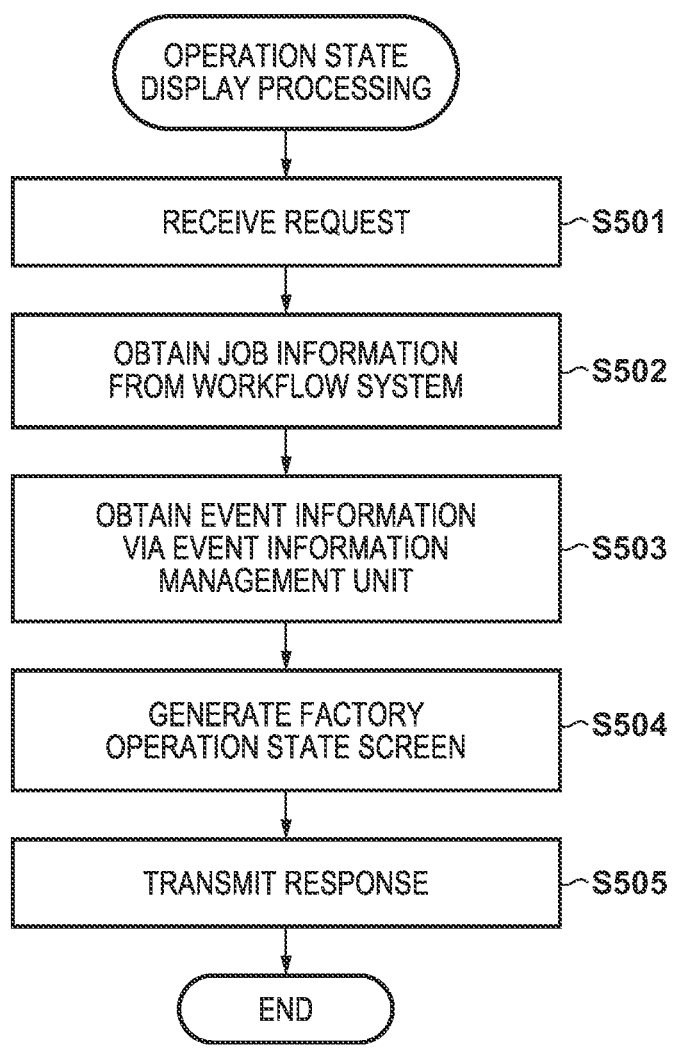
FIG. 5 is a flowchart for explaining an operation state screen generating method according to this embodiment.

FIG. 5 is a flowchart in which the DB 106 generates an operation state screen concerning a printing factory.

In step S501, the operation state generating unit 343 of the DB 106 receives an operation state screen generation request from a client PC (not shown) via the communication unit 341.

In step S502, the operation state generating unit 343 obtains job information from the workflow system 101. The job information includes device IDs, start dates and times, and end dates and times. This information indicates a specific time zone in which each device has operated.

In step S503, the operation state generating unit 343 obtains event information via the event information management unit 342. The event information includes detection start dates and times, detection end dates and times, and device IDs. This information indicates a specific time zone in which each device has performed a preprocessing operation.

In step S504, the operation state generating unit 343 generates an operation state screen 600 (to be described later). In step S505, the operation state generating unit 343 transmits the operation state screen as a response to a client PC. In the above manner, the DB 106 generates an operation state screen.

Figure 6:
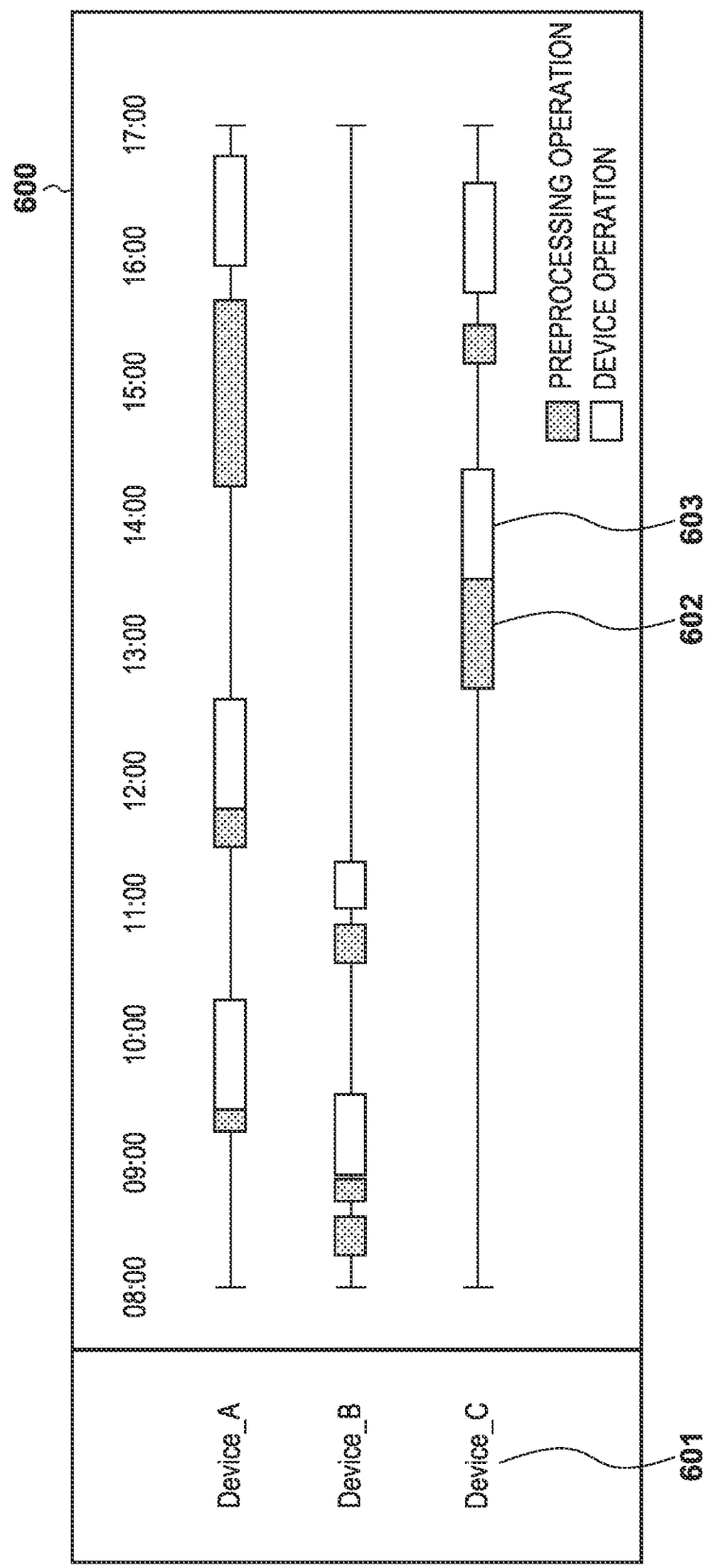
FIG. 6 is a view showing an example of an operation state screen according to this embodiment.

FIG. 6 shows an example of the operation state screen 600 generated by the operation state generating unit 343 in step S504 in FIG. 5. An area 601 is a device ID display portion. A time line 602 is a time line indicating a time zone in which each device has performed a preprocessing operation and is generated from the event information obtained in step S503. A time line 603 is a time line indicating a device operation time zone in each device, and is generated from the event information obtained in step S502.

A time indicating a preprocessing operation of an event that can be obtained from event information is discrete. This is because the camera management system 102 divides capturing of a device by a predetermined time, and hence there are time zones in which no capturing is performed.

For example, in the case of Table 4, in the preprocessing operation time of "Device_B", no preprocessing operation is performed between "2019-11-21T10:32:00Z" and "2019-11-21T10:34:00Z". This indicates that there is a blank time in this time because the network camera 103 performs cyclic capturing of another device. For this reason, the operation state generating unit 343 specifies a plurality of preprocessing times concerning one monitoring target device, and may ignore the interval between them as long as it falls within a predetermined time. That is, the operation state generating unit 343 may ignore a blank time within a predetermined time and regard that the preprocessing operation is continuous. This embodiment is configured to ignore a blank time within one cyclic operation time as the total capturing time in cyclic operation settings.

At this time, in the case of Table 4, assume that "Device_B" has performed one preprocessing operation between "2019-11-21T10:31:00Z" and "2019-11-21T10:35:00Z". In addition, assume that another preprocessing operation has been done between "2019-11-21T10:41:00Z" and "2019-11-21T10:45:00Z". The time between these periods is regarded as a time in which no preprocessing operation has been performed. This is because the time between the periods exceeds the cyclic operation interval.

This operation state screen enables the user to grasp the accurate operation state of a printing factory, including preprocessing operations as well as the operation states of devices.

As described above, according to this embodiment, a monitoring target device is captured, and the operation state of the device and a preprocessing operation state can be detected in accordance with the state of the device or its neighboring state (status). In addition, setting a device for which preprocessing may have been performed, that is, a device in a waiting state, as cyclic observation target makes it possible to efficiently perform monitoring without a monitoring time on a device for which preprocessing has not likely been performed.

Second Embodiment

In the first embodiment, if the status of the job information is "waiting" in step S404 in FIG. 4, a capturing target is always captured, and video analysis is performed. Even if there is a process in "waiting" status concerning a given device, when the previous process is being executed, a preprocessing operation in the "waiting" process concerning the device is rarely performed until the processing in the previous process is completed. This is because an output from the process tends to become a processing target in the next process. Accordingly, this embodiment will exemplify a case in which capturing is more efficiently performed by determining, based on the status of preprocessing in a process of interest, whether a capturing target device is to be captured. Note that a description of the same part as that of the first embodiment will be omitted.

Figure 7:
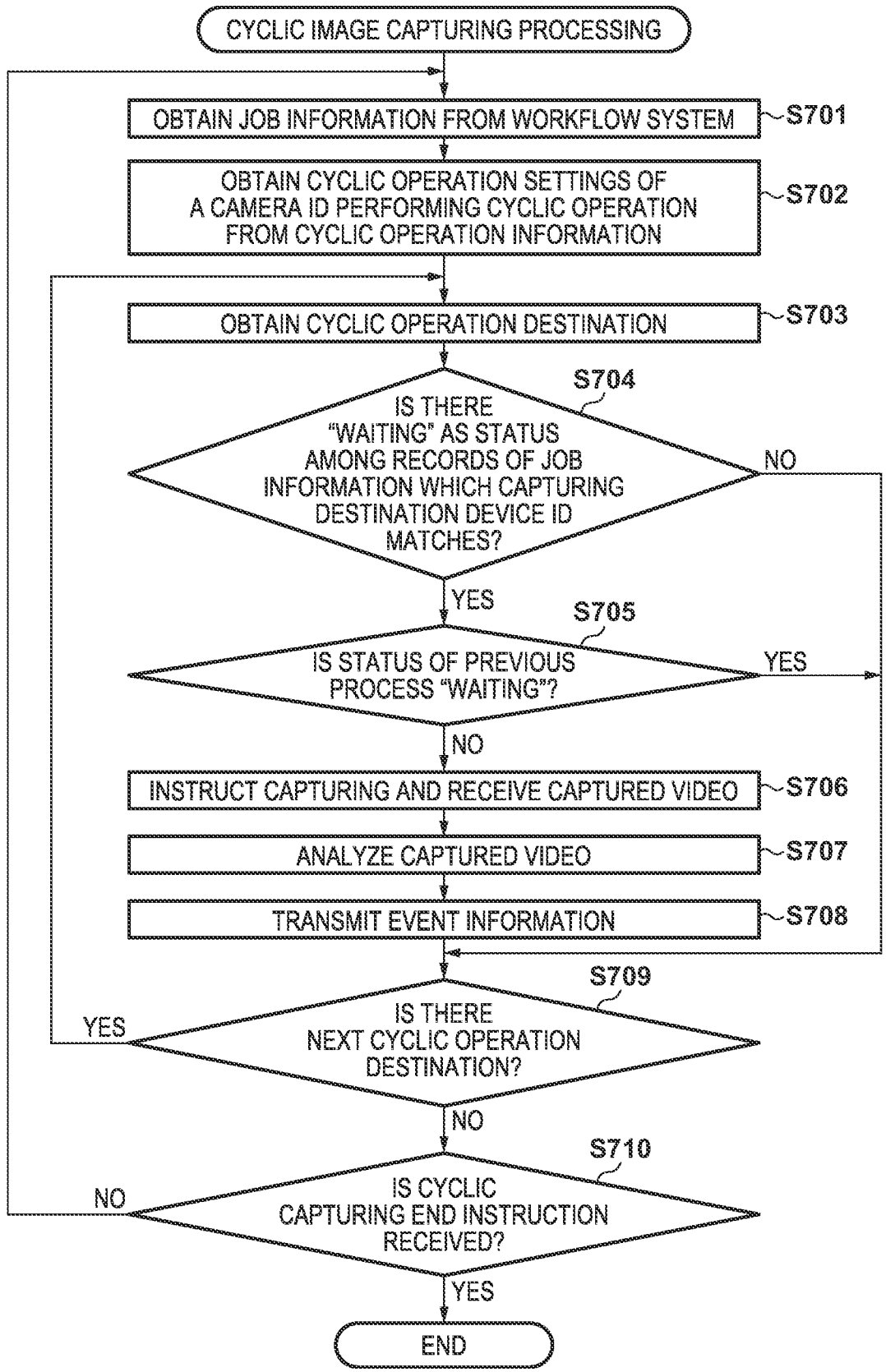
FIG. 7 is a flowchart for explaining a cyclic capturing method according to the second embodiment.

FIG. 7 is a flowchart for explaining a cyclic capturing method in a camera management system 102 according to this embodiment. Steps S701 to S704 are respectively the same as steps S401 to S404, and hence a description of them will be omitted.

If there is a record with the status "waiting" in step S704, it is determined that there is a possibility that a preprocessing operation is performed, and step S705 is executed. In this case, in step S704, the record with the status "waiting" is a reference process record.

In step S705, a cyclic operation control unit 318 obtains a record of job information including a job ID matching a reference process record and preceding the reference process record. Assume that in this embodiment, whether a given process is a previous process can be discriminated by comparing the magnitudes of the process IDs. The cyclic operation control unit 318 determines whether the status of the obtained record of the previous process is "waiting".

If it is determined in step S705 that the status is "waiting", the process branches to step S709. If the status is "in progress" or "normal termination", the processing in step S706 is executed. In this case, if there are a plurality of processes before the reference process and if the status of one of the processes is "waiting", "waiting" may be determined in step S705. Steps S706 to S710 are respectively the same as steps S405 to S409, and hence a description of them will be omitted.

Cyclic capturing can be skipped for even a device for which the status is determined as "waiting" in step S705 in FIG. 7 and which is determined as a capturing target in step S704 depending on the status in a process before a process of interest. Reducing capturing for which a preprocessing operation is not likely to be performed can lead to more efficient capturing.

Third Embodiment

The first and second embodiments have exemplified the methods for efficiently obtaining information about preprocessing operations. For this reason, according to the first and second embodiments, no capturing is performed if it is determined in step S404 that all the statuses of job information are "normal termination", that is, no capturing is performed for a device that is not planned to be operated.

The third embodiment described below is an embodiment that can improve productivity, including postprocessing operations, by also efficiently obtaining information about postprocessing operations. Some device is configured to perform an operation as a postprocessing operation even after the completion of all jobs depending on the type of postprocessor. In the case of a cutting machine, a chip receptor cleaning operation is such an operation. This embodiment will exemplify a case in which setting a device, as a capturing target, from which an event is to be detected even after the completion of all operation jobs will also obtain information about postprocessing operations. Note that a description of the same part as that of the second embodiment will be omitted.

Figure 8:
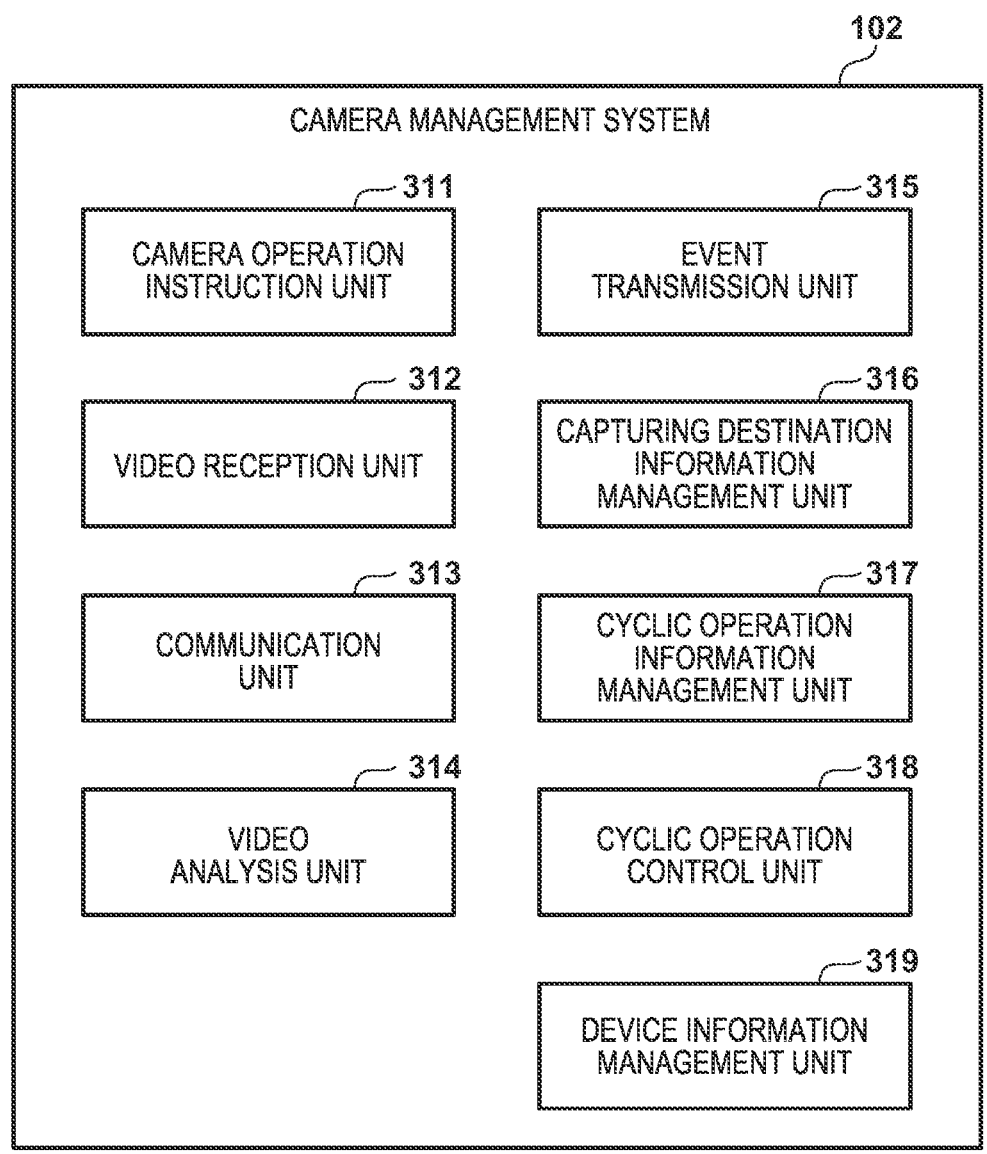
FIG. 8 is a block diagram showing the software configuration of a camera management system 102 according to the third embodiment.

FIG. 8 shows the software configuration of a camera management system 102 according to this embodiment. The camera management system 102 includes a camera operation instruction unit 311, a video reception unit 312, a communication unit 313, a video analysis unit 314, an event transmission unit 315, a capturing target information management unit 316, a cyclic operation information management unit 317, a cyclic operation control unit 318, and a device information management unit 319. Table 5 illustrates an example of the device information managed by the device information management unit 319.

TABLE 5

| Device ID | Device Type |
|---|---|
| Device_A | printer |
| Device_B | cutting_machine |
| Device_C | bookbinding_machine |

Device information is constituted by device IDs for uniquely identifying a printer 104 and a postprocessor 105 and device types such as a printer, a cutting machine, and a bookbinding machine.

Figure 9A:
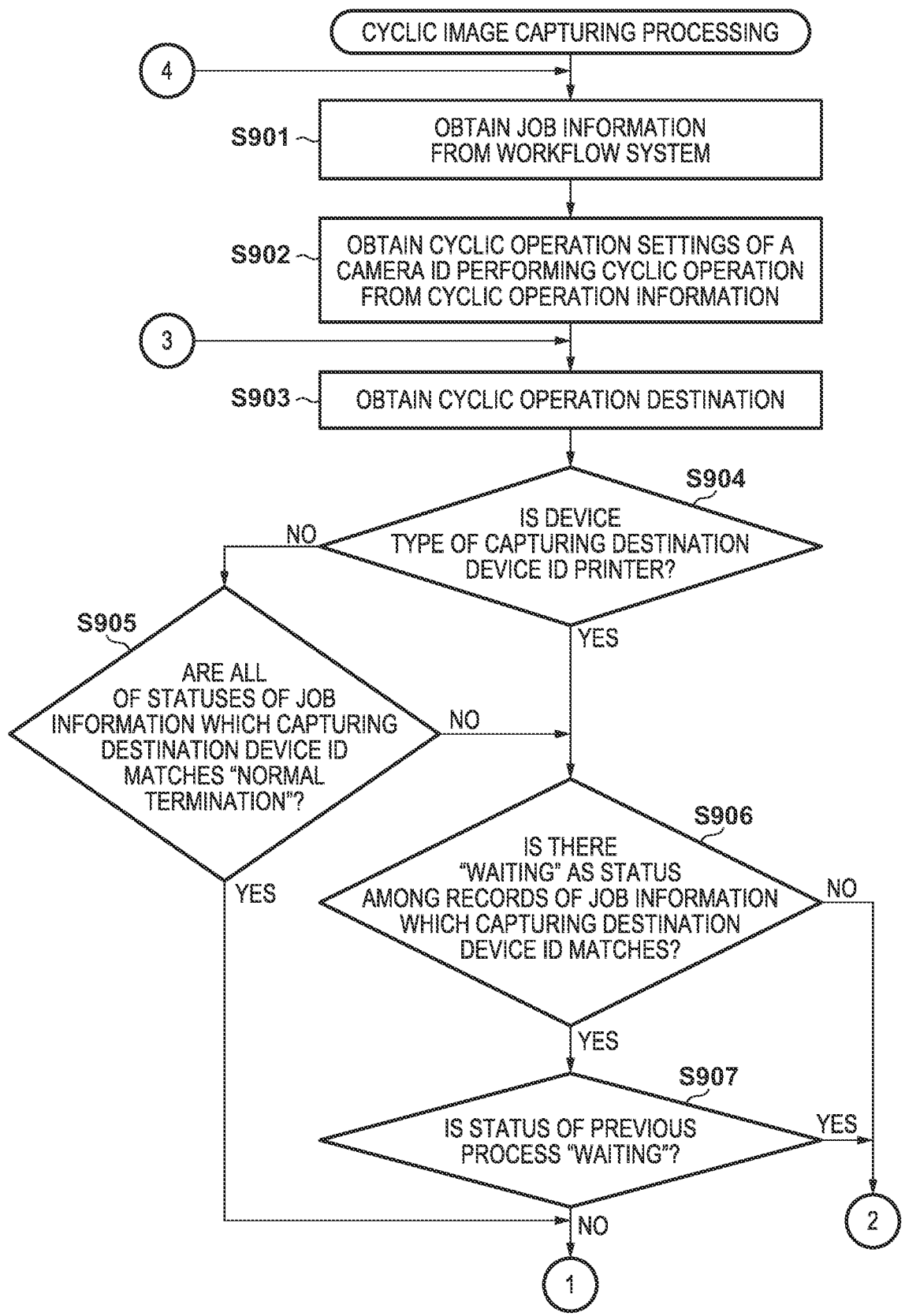
FIGS. 9A and 9B show a flowchart for explaining a cyclic capturing method according to the third embodiment.
Figure 9B:
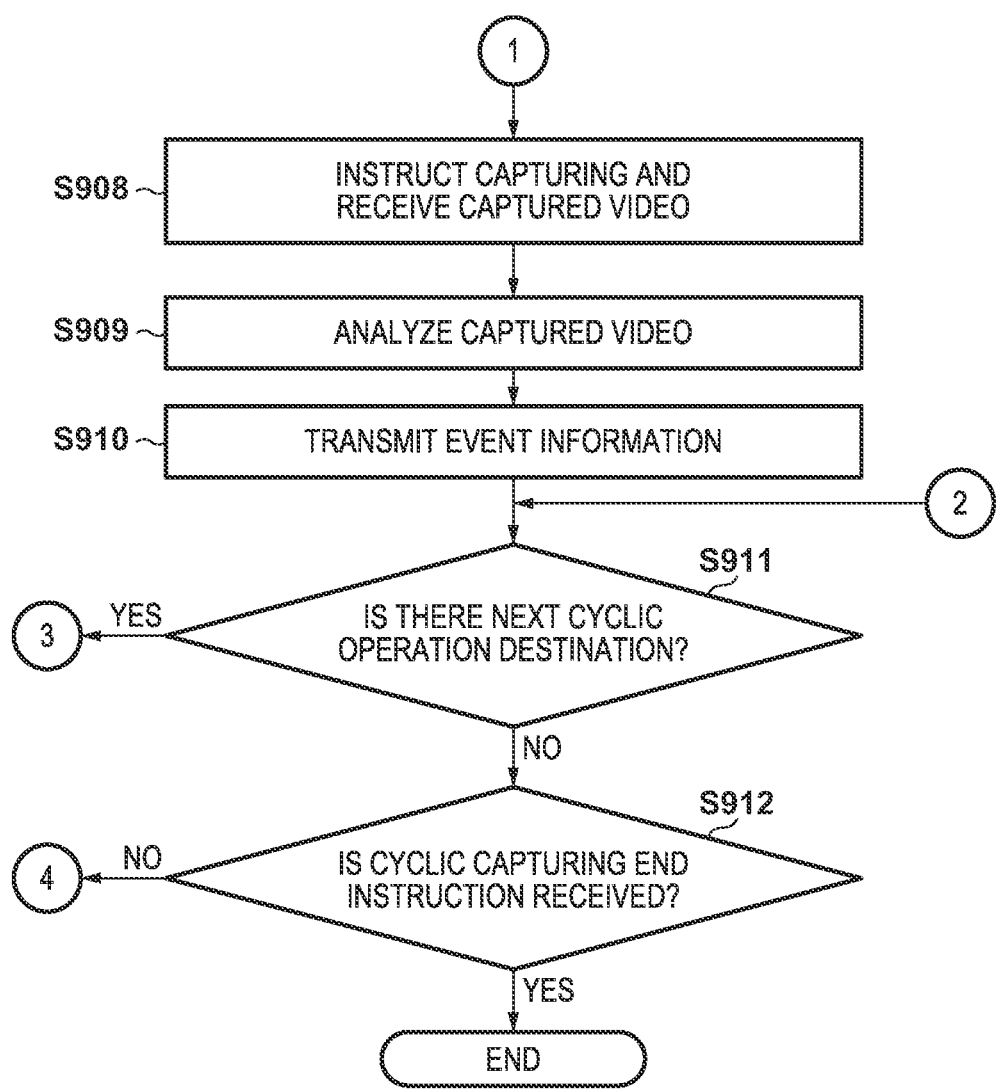

FIGS. 9A and 9B show a flowchart for explaining a cyclic capturing method in the camera management system 102 according to this embodiment. Steps S901 to S903 are respectively the same as steps S701 to S703, and hence a description of them will be omitted.

When cyclic operation settings can be obtained in step S903, the processing in step S904 (to be described later) is executed. In step S904, the cyclic operation control unit 318 obtains a device type of device information which matches the device ID of a capturing target included in cyclic operation settings via the device information management unit 319, and discriminates whether the device is a printer. In this embodiment, the processing to be performed is switched depending on whether a given device type is a printer. However, the device type may be other than a printer. Upon determining in step S904 that the device is a printer, the cyclic operation control unit 318 executes the processing in step S906. Upon determining in step S904 that the device type is not a printer, the cyclic operation control unit 318 determines in step S905 whether all the statuses of information of the job information obtained in step S901 which the device IDs of capturing targets included in cyclic operation settings match are "normal termination". Devices other than a printer include, for example, postprocessing apparatuses.

In step S905, if, for example, the device ID at the capturing target included in the cyclic operation settings is "Device_B" and if the job information is like that illustrated in Table 1, the cyclic operation control unit 318 determines that all the statuses are "normal termination". Upon determining in step S905 that all the statuses are "normal termination", the cyclic operation control unit 318 executes the processing in step S908 (to be described later). If NO in step S905, the cyclic operation control unit 318 executes the processing in step S906. Steps S906 to S912 are respectively the same as steps S704 to S710, and hence a description of them will be omitted.

In this embodiment, even if it is determined in steps S904 and S905 that capturing is to be continued even for a device whose statuses are all "normal termination", for example, a postprocessor, continuing capturing can reduce the overlooking of changes in operation state. Note that it is determined in step S904 that a capturing target device is a printer, and the process branches to step S905 if the device is other than a printer. Alternatively, it may be determined in step S904 whether a capturing target device is a device that requires a post-operation after processing, for example, a cutting machine, and the process may branch to step S905 if the capturing target device is the corresponding device. This configuration makes it possible to continue monitoring even after the completion of a job concerning a device that requires a post-operation.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-020893, filed Feb. 10, 2020 which is hereby incorporated by reference herein in its entirety.

What is claimed is:

1. A monitoring control apparatus comprising:
at least one memory; and
at least one processor
wherein when executing a program stored in the at least one memory, the processor causes the apparatus to operate as:
a saving unit configured to save a capturing order of a plurality of devices by a capturing unit;
an acquisition unit configured to acquire an execution status of a job for each of the plurality of devices;
a control unit configured to specify a target device in accordance with the capturing order and capture the specified target device with the capturing unit; and
a detection unit configured to receive a video obtained by capturing the target device with the capturing unit and detect an event associated with the target device based on the video,
wherein the control unit specifies a first device as a next target device according to the capturing order, captures the first device with the capturing unit in a case where the first device is in a waiting state for awaiting job processing, and specifies a second device as the next target device that is a next device after the first device according to the capturing order without specifying the first device as the next target device in a case where the first device is not in the waiting state.

2. The apparatus according to claim 1, wherein the control unit specifies the second device next after the first device as the target device in accordance with the capturing order if the first device is in the waiting state and if there is a process in a waiting state before a process to be executed by the first device in the job.

3. The apparatus according to claim 2, wherein the control unit further captures the first device with the capturing unit if the first device is a predetermined type of device and if all jobs using the first device are completed.

4. The apparatus according to claim 1, wherein the detection unit detects an event by detecting a predetermined target from the video.

5. The apparatus according to claim 4, wherein the predetermined target includes a worker or lighting of a lamp of the target device.

6. The apparatus according to claim 1, wherein when executing the program, the processor further causes the apparatus to operate as a unit configured to transmit the detected event to an information processing apparatus configured to display the event on a user interface.

7. A monitoring system comprising:
a monitoring control apparatus;
and
an information processing apparatus configured to receive an event from the monitoring control apparatus and display the event on a user interface,
the monitoring control apparatus comprising
at least one memory; and
at least one processor
wherein when executing a program stored in the at least one memory, the processor causes the apparatus to operate as:
a saving unit configured to save a capturing order of a plurality of devices by a capturing unit,
an acquisition unit configured to acquire an execution status of a job for each of the plurality of devices;
a control unit configured to specify a target device in accordance with the capturing order and capture the specified target device with the capturing unit,
a detection unit configured to receive a video obtained by capturing the target device with the capturing unit and detect an event associated with the target device based on the video, and
a unit configured to transmit the detected event to an information processing apparatus configured to display the event on a user interface,
wherein the control unit specifies a first device as a next target device according to the capturing order, captures the first device with the capturing unit in a case where the first device is in a waiting state for awaiting job processing, and specifies a second device as the next target device that is a next device after the first device according to the capturing order without specifying the first device as the next target device in a case where the first device is not in the waiting state.

8. A non-transitory computer-readable medium storing a program instruction for causing a computer to execute an operation when the computer is executing the program, the operation including:
saving a capturing order of a plurality of devices by a capturing unit;
acquiring an execution status of a job for each of the plurality of devices;
specifying a first device as a next target device according to the capturing order,
capturing the first device with the capturing unit in a case where the first device is in a waiting state for awaiting job processing,
receiving a video obtained by capturing the first device with the capturing unit and detecting an event associated with the first device based on the video; and
specifying a second device as the next target device that is a next device after the first device according to the capturing order without specifying the first device as the next target device in a case where the first device is not in the waiting state.

9. A monitoring control method executed by a monitoring control apparatus including a saving unit saving a capturing order of a plurality of devices by a capturing unit and an acquisition unit configured to acquire an execution status of a job for each of the plurality of devices, the method comprising:

specifying a first device as a next target device according to the capturing order, and capturing the first device with the capturing unit in a case where the first device is in a waiting state for awaiting job processing, and receiving a video obtained by capturing the first device with the capturing unit and detecting an event associated with the first device based on the video; and specifying a second device as the next target device that is a next device after the first device according to the capturing order without specifying the first device as the next target device in a case where the first device is not in the waiting state.

\* \* \* \* \*